United States Patent [19]
Klinger

[11] Patent Number: 4,721,421
[45] Date of Patent: Jan. 26, 1988

[54] CUTTING TOOL WITH CHIP BREAKERS

[75] Inventor: Roger L. Klinger, Millersburg, Pa.

[73] Assignee: Brubaker Tool Corporation, Millersburg, Pa.

[21] Appl. No.: 915,112

[22] Filed: Oct. 3, 1986

[51] Int. Cl.$^4$ .............................................. B23C 5/10
[52] U.S. Cl. ...................................... 407/63; 407/54; 407/116
[58] Field of Search ...................... 407/53, 54, 59, 63, 407/115, 116; 408/220, 224

[56] References Cited
U.S. PATENT DOCUMENTS

| | | | |
|---|---|---|---|
| 1,846,508 | 2/1932 | Bridges | 408/220 |
| 1,881,281 | 10/1932 | Lamond | 408/220 |
| 2,855,657 | 10/1958 | Erhardt | 407/63 |
| 3,409,965 | 11/1968 | Fisher | 407/63 |
| 3,736,634 | 6/1973 | Sonnie | 407/54 |
| 4,083,643 | 4/1978 | Parone | 407/59 |
| 4,212,568 | 7/1980 | Minicozzi | 407/63 |
| 4,285,618 | 8/1981 | Shanley | 407/59 |
| 4,462,727 | 7/1984 | Marburger | 408/220 |
| 4,497,600 | 2/1985 | Kishimoto | 407/53 |

Primary Examiner—Nicholas P. Godici
Assistant Examiner—Jerry Kearns
Attorney, Agent, or Firm—Gifford, VanOphem & Sprinkle

[57] ABSTRACT

A rotary cutting tool consists of a cutting body portion having a longitudinal axis and a plurality of blades separated by flutes extending the length of the cutting body portion. Each of the blades have a leading face side, a trailing face side, and a relieved land surface bridging the leading face side and trailing face side. The relieved land surfaces are interrupted by a plurality of spaced V-shaped notches to form a plurality of cutting edges at the intersection of the leading face side and the relieved land surface. The plurality of spaced V-shaped notches further define a plurality of cutting teeth having a leading face edge, a trailing face edge, and a flat land therebetween. A notch relief groove generates a positive relief at the plurality of cutting edges, leading face edges, and trailing face edges such that the cutting performance of the rotary cutting tool is significantly enhanced.

17 Claims, 6 Drawing Figures

CUTTING TOOL WITH CHIP BREAKERS

BACKGROUND OF THE INVENTION

1. Field of the Invention

The invention relates to a rotary cutting tool with chip breakers and, more particularly, to a rotary cutting tool or the like in which the metal removing teeth have been modified so as to enable the tool to be operated at high speeds to form a smoother cut with less pressure and heat generation than is possible with conventional cutters and also to reduce power requirements associated with such a rotary cutting tool.

2. Description of the Prior Art

For illustrative purposes, the specification will describe the invention as it pertains to a conventional end will, i.e., a milling cutter of cylindrical configuration having a shank portion and a cutting portion, the cutting portion containing a plurality of helically disposed cutting blades extending from the shank portion of the milling cutter to the free end thereof. In such a milling cutter, the cutting edges of the blades lie on a substantially constant radius with respect to the longitudinal axis of the tool. However, the invention may also have application to tapered end mills wherein the cutting portion is generally frustoconical in form, and the cutting edge of each tooth has a constantly decreasing radius with respect to the longitudinal axis of the tool as the edge extends from the shank end of the cutting portion to the free end. Also in such a tapered end mill, the cutting edges of the teeth are at the same radius from the longitudinal axis of the tool in any plane through the cutting portion and perpendicular to the longitudinal axis of the tool. The invention also has application to the so called "straight fluted" end mill wherein the teeth extend parallel to the longitudinal axis of the tool, as opposed to helically with respect thereto and, of course, the invention may also be utilized with other forms of rotary cutting tools which are not properly categorized as end mills or milling cutters.

There are several inherent problems in the use of the conventional milling cutter as described above. Generally, these problems manifest themselves in excessive wear and relatively poor cutting actions, or both, due to the fact that the entire length of the cutting edge may be applied to the workpiece at the same time, and due to the fact that continuous chips are produced which are not satisfactorily removed from the work area. There have been many attempts to improve the cutting action and decrease the wear in such tools, and these attempts usually involve the use of so called "chip breakers" in the form of relatively deep notches cut transversely into the cutting blade at spaced intervals, or some similar form of providing an interrupted cutting edge along each blade. One such form as hereinabove referred to is a "chip breaker" described in Erhardt, U.S. Pat. No. 2,855,657, issued Oct. 14, 1958, which discloses that the cutting edge of each blade is provided at spaced intervals along each helical blade with notches of substantial depth which are ground therein for the purpose of interrupting the chips produced by the plurality of helically disposed parallel cutting teeth. It is further noted that the notches in successive teeth circumferentially of the tool are slightly axially offset, this effect preferably being obtained by grinding such notches in a low pitch helical path circumferentially of the tool. Erhardt further discloses a shallow bevel merging with each such notch and formed on one side of the notch of one tooth and on an opposite side of such notch of the next adjacent tooth so that they alternate first to one side and then to the other. The purpose of such arrangement is to balance out the endwise thrust on the tool and to maintain the torque more nearly centered. This attempted solution to the aforementioned problems has met with some success in improvement of tool life and in facilitating chip removal from the work area, although such success is due primarily to the fact that smaller, discontinuous chips are produced which may be more readily removed from the work area. In other words, the solutions have been directed primarily to a form of the chip produced, rather than removal of the chips from the work area. Also, in the construction as suggested by Erhardt wherein the helical cutting edges are interrupted axially of the body by one or more helical grooves which spiral about the body at either the same or different pitches as the flutes, but in opposite directions, that is, the flutes spiral in the right-hand direction, whereas the grooves spiral in a left-hand direction, the grooves then are disposed in a direction which impedes chip removal. That is, a chip at the leading edge of a cutting tool defined by a groove normally tends to move towards the shank end of the cutter along the helix of the flute, but if the chip enters the groove, it is urged towards the cutting end of the cutter. As a result, the pressure relief advantages caused by grooves are dissipated to some extent, the tool operates at a higher temperature, and the smoothness of the cut suffers.

Several attempts have been made in the prior art to solve this problem. For example, Cave et al, U.S. Pat. No. 3,548,476, discloses a cutter having a plurality of helical flutes of uniform length and depth which form a plurality of helical cutting edges circumferentially spaced from one another by the flutes and which spiral about the axis of the body in the same direction at the same pitch as the flutes. Each of the cutting edges extend radially of the body and merge smoothly with its associated cutting edge which spirals in a right-hand direction about the axis of the body at a predetermined angle. These cutting edges are interrupted longitudinally at spaced intervals by a plurality of notches. The notches are formed by a groove which spirals about the axis of the body in the same direction (right-hand helix for both flutes and notch groove) of the flutes but at a steeper pitch. The helix on which the notches are formed and the width of the notches in the teeth should be so selected that the circumferentially adjacent teeth on successive cutting edges are offset axially from one another by an amount such that each circumferentially successive tooth has a portion which follows a portion of a groove in a preceding cutting edge. The amount of offset between successive teeth should be such that, for each complete revolution of the body, the tooth trailing any given notch will more than offset the length of the notch. A cutting tool construction in accordance with the disclosure of Cave defines advantages in that the formation of discontinuous chips facilitates chip removal and the spiraling of the notches in the same direction as the flutes further facilitates chip removal. Moreover the discontinuous cutting teeth result in less drag or resistance to rotation of the tool when it is in operative engagement with a workpiece, thereby reducing deflection of the tool and permitting cutting of the workpiece to closer tolerances than would otherwise be possible, enabling the tool to operate at a relatively low temperature and thereby increasing tool life. The specific problems inherent in Cave, however, that is, the notches which form the groove which spirals about the axis of the body in the same direction as the flutes generate a strong longitudinal force during a cut and, eventually, as the tool dulls this force will become sufficient to pull the cutting tool from its workholding device.

Minicozzi, U.S. Pat. No. 4,212,568, is also directed to the problem of facilitating chip removal from the work area while improving the tool life. Minicozzi discloses a conventionally constructed cutting tool as set forth above wherein during the spiral forming of the flutes in the cutting portion of the cutting tool a template is used which, as the fluting mill is moved along a spiral path from one end of the cutting portion to the other, causes the flute mill to move alternatively towards and away from the longitudinal axis of the tool to be formed along an undulating or sinusoidal path so that each tooth will have a cutting face and a trailing face with surfaces which undulate generally sinusoidally from one end of the cutting portion to the other. Minicozzi further discloses that the leading edge and trailing edge of each blade is interrupted by a plurality of relatively shallow transverse depressions of relatively large radius arcuate cross-section resulting in cutting edges with a variable rake angle which tends to reduce tool wear. Further, the sinusoidally undulating surface of the cutting face of each tooth gives rise to a rake angle at each cutting edge which varies continuously along the length of the cutting edge, facilitating the formation of relatively small chips. When these chips move through the space where the cutting and trailing face surfaces are convex they tend to squeeze at these areas and tend to spring away from the workpiece and the cutting tool when free to do so, in this way facilitating chip removal. The cutting tool disclosed in Minicozzi is time consuming to manufacture and, therefore, expensive. Additionally, its chip removing feature provides little improvement to the feed and speed characteristics of the cut.

Shanley, Jr., U.S. Pat. No. 4,285,618, recognizes the need for rapid cutting and the requirement of smooth dimension finishing qualities simultaneously. Accordingly, Shanley, Jr. discloses a conventional cutting tool of a hard metal body whose cutting portion surface is formed into a plurality of blades separated by flutes, each blade having a leading side, a cutting edge on the leading side, a land, and a trailing side of face; at least two of the blades having at least one smooth segment, wherein the land and cutting edge are even and unbroken, and at least one serrated segment formed with crests that are flat, round, or sinusoidal, wherein the land consists essentially of a row of cutting teeth, adjacent teeth in the lands being separated from each other by a transverse groove in the blade. The smooth end serrated segments are located in staggered positions from blade to blade, so that in the course of one complete revolution of the cutter, each point along a surface being formed by the cutter will be contacted by at least one smooth segment and at least one serrated segment. The serrated segments are arranged in such a pattern from blade to blade that continuous, imaginary line passing across each blade at precisely the midpoint of each serrated segment would define a helix of uniform angle around the cutting section measured from a line which is parallel to the shank section. Shanley, Jr. further disclosed that the helix may be right-handed or left-handed such that the helix of the serrated segments is the same as the helix of the blades on the cutting portion of the tool. Generally, the cutter will be capable of faster metal removal if the lay of the helical serration pattern is opposite that of the helical pattern of the blades. Shanley Jr. discloses that the teeth in the serrated segments may be formed with flat, rounded or sinusoidal crests. This type of tooth formation, however, will result in drag and galling of the leading edge of the cutting tooth since the leading edge of the cutting tool has a negative rake angle.

Kishimoto, U.S. Pat. No. 4,497,600, discloses an end mill wherein the shape and the arrangement of the notch required for the blade can be freely selected without using thread cutting. Kishimoto disclosed a cutting tool wherein along the whole circumferential surface of each blade, notches are machined at prescribed intervals, extending transverse to the length of each blade. Each notch is shifted slightly along the blade toward the tool end or the shank end relative to a corresponding notch on the preceding blade. When X is taken as the width of the blade surface between notches, Y as the width of the notch, and Z as the amount of shift of a notch relative to the corresponding notch in the adjacent preceding blade, the shift (Z) of the notch is at least equal to $(X+Y)/(N)$ (where N is the number of blades). In the case of shifting the notch toward the tool end, the inclination of the notch on its own axis is toward the shank end and when shifting the notch toward the shank end, the inclination of the notch on its own axis is toward the tool end. Since the notches are formed at the prescribed intervals and with a shift of a prescribed amount, rather than being formed along a helical path as in a screw thread, the side clearance of the notch is not limited by the number of blades. Since the direction of the side clearance is varied by the direction of the shift of the notches relative to the preceding and succeeding blades, ". . . the cutting by the main blade is perfectly formed with an important effect of elevating the cutting performance. "The angle of the notch and the shape of the notch can be freely selected depending on the material to be cut. In the conventional tool in which the notch is formed along a helix, such as a thread, these values are fixed. The disclosure of Kishimoto results in a notch in a blade which will have a negative rake angle on the leading or trailing edge of the tooth form. The negative rake angle causes drag and galling of the metal at the cutting edge of the tooth as well as heat build up and higher wear or shorter life of the cutting tool.

What is needed, therefore, is a cutting tool which overcomes the disadvantages of the prior art and which recognizes the advantages of applying chip breaking features in a helix which is opposite hand of the flute helix and hand of cut and which utilizes a chip breaking notch relief angle to generate a positive relief angle on the cutting tooth edges at the point of cutting to maximize the metal removal with a resultant desired close dimensional finishing quality while also realizing an increase in power efficiency to drive the tool through the work.

SUMMARY OF THE INVENTION

The cutting tool of the invention consists of a generally cylindrical blank body section joined to a cutting body section. The cutting body section consists of a plurality of helical blades separated by a plurality of helical flutes of uniform length and depth which form a plurality of helical cutting edges circumferentially spaced from one another by the helical flutes and which spiral about the axis of the body in the same direction and at the same pitch as the helical flutes. Each helical blade has a leading side, a cutting edge on the leading face side, a land, and a trailing face side. The helical flutes, preferably, extend across the cutting body section so as to provide cutter edges as is conventional. Each of the cutting edges extends radially of the body and merges smoothly with its associated cutting edge which spirals in a right-hand direction about the axis of the body at a predetermined angle. The predetermined angle represents the pitch of the cutting edges and may vary from one tool cutter to another.

The cutting edges are interrupted longitudinally at spaced intervals by a plurality of notches. The notches are formed by a groove which spirals about the axis of the body in a direction opposite to that of the flutes or blades and at a preselected pitch. The pitch of the notch forming groove may vary as will be pointed out hereinafter. The notches provide on each of the cutting edges a plurality of longitudinally spaced apart cutting teeth. Suitable relief of the land surface to form the cutting edges provide a cutting edge portion with a positive relief angle. Further, suitable relief of the V-shaped notches, according to the invention, provide a positive relief angle at the leading edge of the cutting tooth while a further positive relief of the trailing edge of each cutting tooth is provided naturally by the helical notch forming groove.

The cutting tool of the invention is primarily useful in either an end cutting or side cutting process. In an end cutting process, the cutter digs a slot or trough in the metal stock, whereas in a side cutting process the periphery of the tool is presented to the vertical side of the workpiece.

The invention may be used with cutting tools having cutting sections formed into any of the configurations commonly used in the milling cutter art. For example, the cutting section may take the general form of a cylinder, having a cutting end, i.e., the end opposite the shank, which may be substantially flat (e.g., as in an "end mill") or rounded (e.g., as in a "ball-nose end mill"). Cylindrical cutting sections are used to quickly remove large amounts of stock from the workpiece in a side cutting process, or to end cut a slot having straight sides. In such an end cutting process, the shape of the cutting end will determine the shape of the bottom of the slot (e.g., a ball-nose end mill will cut a slot with a radius on its bottom). Alternatively, the sides of the workpiece may be angled by using a cutter whose cutting section is in a general shape of a frustum (e.g., as in a "tapered cutter"). Such a cutting section may narrow in a direction away from the shank (e.g., an "angle cutter") or towards the shank (e.g., a "reverse angle cutter" used to cut dovetail slots). Such a frustoconical cutter may have concave sides (e.g., a "radius cutter") if desired.

The blades and flutes can either extend straight down the sides of the cutting section parallel to the axis of the shank, or they can extend around the cutting section in the helical direction. Straight blades and flutes are less expensive to manufacture, but are rougher on milling equipment because of the repeated shock as each blade strikes the workpiece.

The helical blade arrangement is often preferred, because when using that type of cutting tool a portion of the blade is always in contact with the workpiece, and the blades tend to slice off cuttings rather than chip them away.

The blades and flutes of the cutting tool of the present invention are formed according to conventional practice with respect to the shape and size of the flutes, the width of the lands, and the configuration of the leading face side and trailing face side of the blades. A cutter having a relatively large number of blades is preferred over a tool with only two or three blades, because with the greater number of blades each blade takes a smaller bite and, thus, gives an easier cut and reduces the frequency with which the cutter must be sharpened. However, as more blades are added to the tool, the radius of the cutting body section must be increased, thus, limiting the applications in which the tool can be used.

The cutting tool of the present invention combines the desirable qualities of roughing cutters and finishing cutters of the prior art. Each tooth segment of the tool is capable, because of the positive rake angle of the leading and trailing edges of the cutting tooth, of rapidly cutting the workpiece to its desired finished form with enhanced surface characteristics. The total energy required to operate the cutter is substantially less than that of other prior art milling cutting tools because of the positive relief angle of the leading and trailing edges of the cutting tooth, which results in each blade carrying a lower cutting load. Moreover, the heat build up in the cutter and the workpiece is reduced.

Accordingly, it is an outstanding object of the present invention to provide a rotary cutting tool operable to remove more material from the given workpiece in a shorter period of time and with less wear on the tool than any rotary milling tool heretofore known.

Another object of the present invention is to provide a rotary cutting tool of the above character which incorporates the best features of a ground finishing end mill with the rugged construction and chip clearing features of a heavy duty rougher resulting in a precision milled surface yet utilizing less power than conventional semi-finishing cutting tools.

A further object of the present invention is to provide a rotary cutting tool operable at higher production rates yet having a longer tool life than do tools heretofore known when operating at lower production rates in performing similar metal removing operations.

Yet another object of the present invention is to provide a rotary cutting tool having a V-shaped chip breaking groove in the cutting section and utilizing a chip breaking notch relief angle which generates a positive relief angle at the leading and trailing edges of the cutting tooth in order to allow the tool to run at a lower temperature with lower drag and galling tendencies to enable the tool to run at higher feed rates and cutting speeds yet utilize less power than conventional semi-finishing cutting tools.

The foregoing and other objects will be explained more fully in the following detailed description of the invention with reference to the appended drawings.

DETAILED DESCRIPTION OF THE PREFERRED EMBODIMENT

Figure 1A:
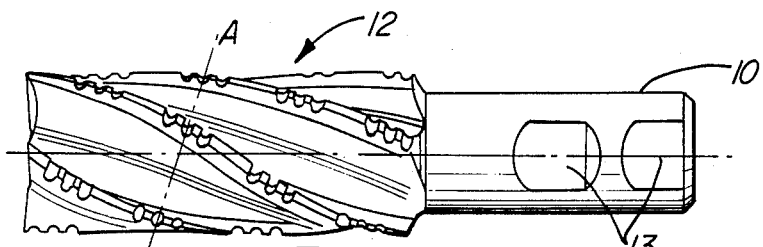
FIG. 1A is a side view of a conventional prior art cutting tool illustrating a right-hand helix for the flutes and an opposite left-hand helix for the notch groove.

For a better understanding of the present invention, it will be useful to briefly describe the manner in which a conventional cylindrical or straight-sided cutting tool with helically arranged teeth and cutting edges as well as chip breakers is formed. Starting with a cylindrical blank, the shank portion and cutting portion of the tool are turned to the proper diameter on a lathe. A plurality of flutes are then spirally formed in the cutting portion of the tool by means of a special flute mill which is so shaped as to form the cutting face of one tooth and the trailing face and land surface of an adjacent tooth in a single pass in which the flute mill is moved along a predetermined spiral path over the surface of the cutting portion of the cutting tool from one end to the other. Normally, the flute mill will be so shaped that the cutting edge portion or the cutting edge of each tooth will have a positive radial rake angle. This can clearly be seen in FIG. 3 as representing the angle generated between a line running through the longitudinal axis of the cutting tool and the cutting edge of the illustrated blade and the line tangent to the cutting face identified as angle Y which, as the expression will be used throughout the specification, means that the cutting edge of each blade has a positive rake angle or positive radial rake relationship with the longitudinal cutting tool axis. In the conventional milling cutting tool, this rake angle will be constant throughout the length of the blade. After milling, the blank so formed is suitably hardened and the shank portion is ground followed by grinding of the land surfaces of the teeth to form a primary clearance angle $P_1$ and a secondary clearance angle to form cutting edges along each tooth at the junction of the leading face of the blade and the land surface. Cylindrical grinding apparatus is conventionally used for these grinding steps.

All of the foregoing steps are conventional and are routinely carried out in the production of conventional milling cutter tools. The principal difference between the manner of producing a conventional cutting tool, as described above, and the manner of producing the cutter of the present invention arises in the manner of putting the chip breaker V-shaped grooves in the cutting tool. The helix on which the V-shaped grooves are ground is opposite to the helix of the flute and blades. The lead angle of the helix is a function of the diameter of the cutting tool as well as the desired positive relief angle of the front or the leading edge of the cutting tooth as will hereinafter be described. Apart from the relationship between the lead angle, positive relief angle on the leading edge of a cutting tooth, and the V-shaped groove relief angle, the formation of the cutting tool of this invention is precisely the same as the formation of a conventional cutting tool and conventional equipment may be employed in the usual steps to complete all other aspects of the milling cutter including the relieving of the land surfaces to form the cutting edges of the blades.

Referring now in detail to the drawings, with particular reference to FIGS. 1A through 1D, prior art cutting tools recognize the advantage of applying serrated segments or chip breaking notches in combination with smooth segments, wherein the land and cutting edges are even and unbroken, and further wherein the land consists essentially of a row of cutting teeth. adjacent teeth in the land being separated from each other by a transverse groove in the blade, the smooth and serrated segments being located in staggered positions from blade to blade, so that in the course of one complete revolution of the cutter each point along a surface being worked by the cutter will be contacted by at least one smooth segment and at least one serrated segment. The serrated segments are arranged in such a pattern from blade to blade that a continuous, imaginary line passing across each blade at precisely the midpoint of each serrated segment would define a helix of uniform angle around the cutting section, e.g., in the range of about sixty to eight-five degrees (60° to 85°) A—A, measured from a line which is parallel to the shank section, as shown in FIG. 1A. Chip breaking notches applied in a helix that is opposite the flute helix and the hand of cut, have a negative action and tend to push the tool into the holder and out of the work. The result is a balanced action which greatly reduces torque and required horsepower.

Figure 1B:
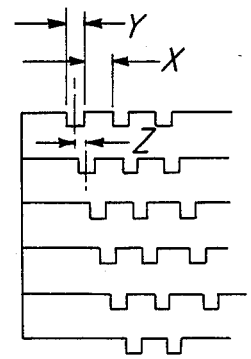
FIG. 1B is a developed view of a prior art cutting tool showing the relationship of the notches between adjacent blades.
Figure 1C:
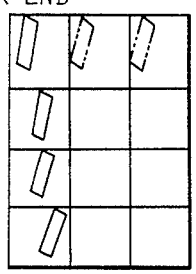
FIG. 1C is a developed view of a prior art cutting tool with the notches individually cut into each cutting blade, with the notches in successive blades shifted towards the shank end and inclined on their own axis toward the tool end.
Figure 1D:
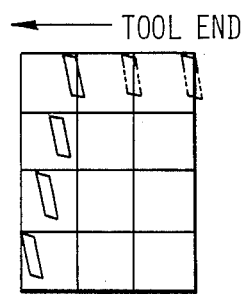
FIG. 1D is a developed view of a prior art cutting tool with the notches individually cut into each cutting blade, with the notches in successive blades shifted towards the tool end and inclined on their own axis toward the shank end.

Referring to FIGS. 1B through 1D, the prior art further recognizes that in order to accomplish similar results without the use of a thread-cutting helical groove, notches extending transverse to the length of the blade may be machined at prescribed intervals. Each notch is shifted slightly along the blade toward the tool end or the shank end relative to a corresponding notch on the preceding blade, and relative to the direction of rotation. When X is taken as the width of the blade surface between notches, Y as the width of the notch, and Z as the amount of shift of a notch relative to the corresponding notch in the adjacent preceding blade, the shift of notch Z is at least equal to $(X+Y)/(N)$ (where N is the number of blades). The notches may be shifted towards either the shank end, FIG. 1C, or tool end, FIG. 1B, and are inclined about their own axis towards the shank end, in the case where the notches are shifted towards the tool end, or towards the tool end, in the case where the notches are shifted towards the shank end. FIG. 1C is the developed view of a case in which notches are shifted towards the shank end. FIG. 1B is a developed view showing notches shifted toward the tool end. FIG. 1D depicts the relationship between adjacent notches and adjacent blades.

Figure 2:
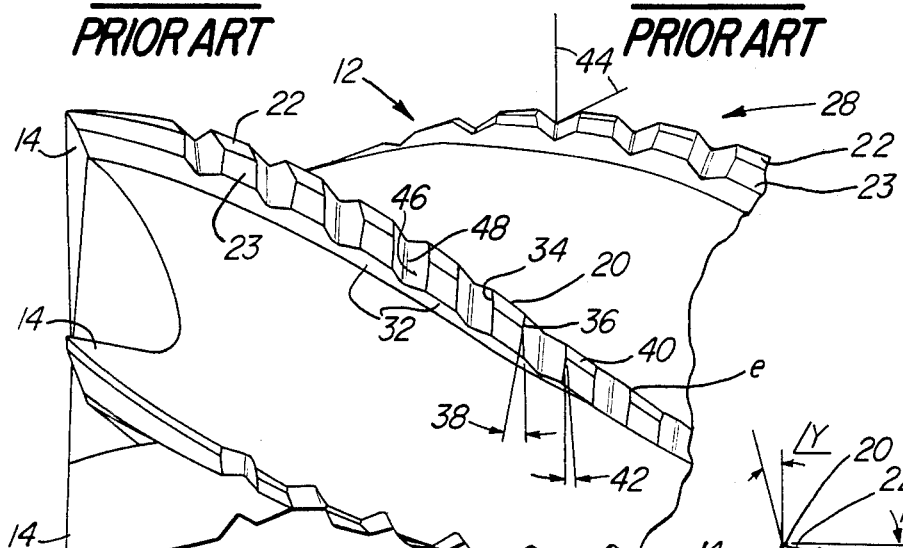
FIG. 2 is a fragmentary exploded side view of the cutting section of the cutting tool according to the present invention.
Figure 3:
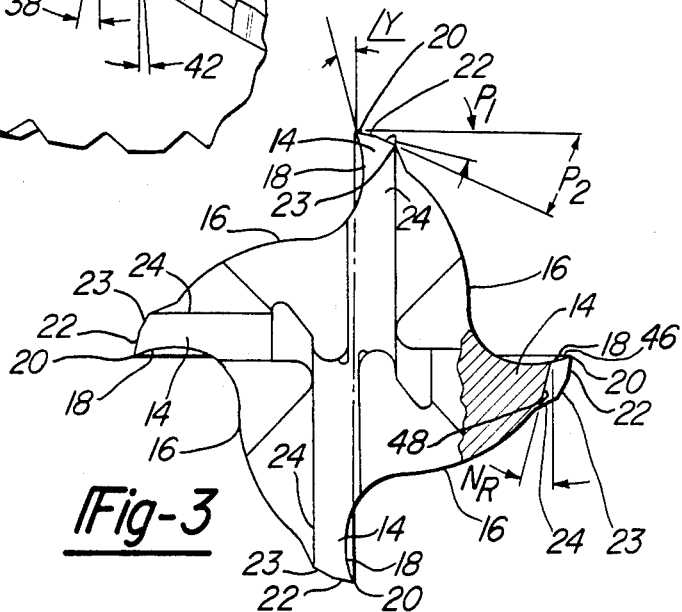
FIG. 3 is an end view of the cutting section of the cutting tool according to the present invention.

The preferred embodiment of the invention as illustrated in FIGS. 2 and 3 will be described in conjunction with the conventional cutting tool shown in prior art FIG. 1A. The cutting tool includes a generally cylindrical shank body section 10 (not shown in the preferred embodiment), joined to a cutting body section 12. The shank body section 10 has a flat 13 for holding the cutter in the chuck of a milling machine. The diameter of the shank body section need not be identical to the diameter of the cutting body section.

The cutting body section is a hard metal body which may assume any of many shapes which are well known in the milling cutter art, as described above.

With reference to FIGS. 2 and 3 the surface of the cutting body section has formed into it a plurality of blades 14. Each blade is separated from the next by a flute 16. In a preferred embodiment, the blades and flutes extend in a helical direction around the body of the cutting section, as illustrated in FIGS. 2 and 3. However, the blades and flutes may take an axial configuration on the cutting section wherein the blades 14 and flutes 16 extend in a straight line from the shank to the cutting end of the cutting body section.

Each blade 14 has a leading face side 18 which merges in concave fashion into a cutting edge 20. Immediately behind the cutting edge 20 is a primary relief land 22 which, in some configurations of a cutter, is followed by a secondary relief land 23, which leads to a trailing face side 24 and, thence, to the flute 16.

The cutting edge 20 of each blade 14 is interrupted longitudinally at spaced intervals by a plurality of V-shaped notches 28. The notches are formed by a V-shaped groove which spirals about the axis of the cutting body section 12 in the opposite direction from the flutes 16. The pitch of the notch forming V-groove may vary, as will be pointed out hereinafter. The V-shaped notches 28 provide on each of the cutting edges 20 a plurality of longitudinally spaced apart cutting teeth 32, as shown in FIG. 2. The effect of grinding the helical notch forming V-groove in the blades of the cutting tool is to create a plurality of cutting edges 20 on each tooth formed at the intersection of the cutting face and the uninterrupted portions of the land surfaces. It can also be seen, as best illustrated in FIG. 2, that a leading face edge 34 and a trailing face edge 36 of each tooth are provided with a generated angle as a result of the grinding tool interfacing with each blade while the groove is being ground along a helical path. When the helix angle of the chip breaking notch is opposite the flute helix angle and the hand of cut, a natural, positive relief angle 38 is generated at the juncture of the trailing face edge 36 of the cutting tooth 32 and the cutting edge 20 of the chip breaking notch. Unfortunately, however, this arrangement can cause an undesirable negative relief angle on the leading face edge 34 of each cutting tooth 32, the point which does the most cutting. A negative relief angle along the leading face edge 34 of a cutting tooth 32 will cause the material being cut to adhere to the tooth, especially where the chip breaking V-shaped groove notch is on a tool having a flat land 40 at the crest of the cutting tooth 32 with a sharp corner C at the juncture of the flat land 40 and the cutting edge 20.

To overcome the negative relief angle as a result of the interrelationship of the V-groove grinding wheel with the blades of the cutting tool, a notch relief groove 46, shown in FIG. 2, is ground into the blade 14 while the V-shaped chip breaker groove is simultaneously ground in the blade. The notch relief groove 46 is ground into the blade with the root surface 48 at a notch or groove relief angle $N_R$. The notch relief angle $N_R$ generates a positive relief angle 42 at the juncture of the leading face edge 34 and the flat land 40 of the cutting tooth 32. Significant improved performance is achieved because the positive relief angle 42 allows the cutting tool to run cooler with significant reduction in drag and galling tendencies, therefore, enabling higher feed rates and cutting speeds. Also, the positive relief angle 42 ensures that the chip breaking notches will remain functional for the regrind life of the tool.

As set forth above, the positive relief angle 42 at the leading face edge 34 of the cutting tooth 32 is generated in actual practice by the grinding of the notch relief groove 46 at the notch relief angle $N_R$. The positive relief angle 42 is further affected by the groove angle 44 of the V-shaped notch. In actual practice it has been discovered that as the groove angle 44 is made larger the notch relief angle $N_R$ must be increased in order to maintain a constant positive relief angle 42 on the leading face edge 34 of the cutting tooth 32. It has also been discovered by empirical data that significantly improved performance is achieved when the positive relief angle 42 is greater than approximately eight degrees (8°). The following table depicts the relationship between the V-shaped groove angle 44, positive relief angle 42, and notch relief angle $N_R$:

TABLE I

| Angle 44 | Angle 42 as a function of Angle $N_R$ and Angle 44 | | | | |
|---|---|---|---|---|---|
| | $N_R = 14°$ | $N_R = 12°$ | $N_R = 10°$ | $N_R = 8°$ | $N_R = 6°$ |
| 60° | 14.2981° | 12.2697° | 10.1127° | 7.8156° | 5.3660° |
| 58° | 13.2716° | 11.3275° | 9.2720° | 7.0956° | 4.7884° |
| 56° | 12.3188° | 10.4576° | 8.5001° | 6.4382° | 4.2638° |
| 54° | 11.4303° | 9.6506° | 7.7874° | 5.8343° | 3.7843° |
| 52° | 10.5983° | 8.8982 | 7.1261° | 5.2764° | 3.3433° |
| 50° | 9.8161° | 8.1937° | 6.5095° | 4.7584° | 2.9355° |
| 48° | 9.0778° | 7.5318° | 5.9319° | 4.2750° | 2.5563° |
| 46° | 8.3783° | 6.9062° | 5.3886° | 3.8219° | 2.2021° |
| 44° | 7.7134° | 6.3138° | 4.8756° | 3.3954° | 1.8698° |
| 42° | 7.0792° | 5.7505° | 4.3892° | 2.9923° | 1.5565° |
| 40° | 6.4723° | 5.2130° | 3.9264° | 2.6098° | 1.2602° |
| 38° | 5.8897° | 4.6985° | 3.4846° | 2.2456° | 0.9787° |

It has also been discovered that as the lead of the helix angle of the grooves is increased, the notch relief angle $N_R$ must be increased to achieve a positive relief angle 42 at the leading face edge 34 of the cutting tooth 32. In actual practice, values of greater than approximately eighteen degrees (18°) for the notch relief angle cannot be attained. The following table reflects the changes required in the notch relief angle as the V-shaped groove angle 44 decreases with an objective of maintaining a positive relief angle of approximately ten degrees (10°).

TABLE II

| Angle 44 | Increase in Angle $N_R$, Required to Maintain Angle 42 at 10+°, as Angle 44 Decreases | | | | | |
|---|---|---|---|---|---|---|
| | $N_R = 15.5°$ | $N_R = 17.0°$ | $N_R = 18.0°$ | $N_R = 19.0°$ | $N_R = 20.5°$ | $N_R = 22.0°$ |
| 48° | 10.2051° | | | | | |
| 46° | | 10.5093° | | | | |
| 44° | | | 10.4098° | | | |
| 42° | | | | 10.2774° | | |
| 40° | | | | | 10.4082° | |
| 38° | | | | | | 10.4764° |

A cutting tool constructed in accordance with the present invention is utilized in the same manner as the conventional cutting tool, but has certain definite advantages over the latter. For example, the positive relief angle 42 generated at the leading face edge 34 of the cutting teeth 32 results in less drag, lower galling tendencies, and cooler cutting temperatures. Therefore, the cutting tool may be run at higher feed rates and cutting speeds. Further, operating at relatively lower temperatures, coupled with less drag and lower galling tendencies, makes it possible for the tool to provide a workpiece with a better surface finish which eliminates the necessity of finish grinding in many instances and utilizes up to twenty percent (20%) less power than conventional semi-finishers, allowing production rates to be boosted.

The production of a cutting tool in accordance with the foregoing description gives rise to a number of advantages which manifest themselves in superior performance, highly improved wear characteristics, ease of manufacture and relatively simple maintenance. The latter arises because the cutting tool of the invention is provided with a positive rake relief angle of the cutting edges, and positive relief angles of the trailing and leading edges of the cutting tooth, and while being of rather unusual form, may nevertheless be sharpened and reground with conventional equipment.

It is, of course, to be understood that the present invention is by no means limited to the particular construction shown in the accompanying drawings, but also encompasses many modifications within the scope of the appended claims. For example, as previously noted, the invention has been shown in conjunction with a spirally fluted cutting tool. However, the invention may also be useful with other forms of cutting tools, such as straight fluted cutting tools or tapered cutting tools and, indeed, may be applicable to other types of rotary cutting tools. Further, it will be appreciated that such cutting tools may vary considerably in diameter and size, and that the depth of cut of the flute will employed during construction of the cutting tool may vary considerably depending upon the desired cutting edge.

What is claimed is:

1. A rotary cutting tool comprising:
a shank body portion;
a cylindrical cutting body portion adjacent said shank body portion, said cutting portion having a longitudinal axis and a plurality of helical blades separated by helical flutes extending the length of said cutting portion, each of said helical blades having a leading face side, a trailing face side spaced from said leading face side and a relieved land surface bridging said leading face side and said trailing face side, said plurality of helical flutes and blades being at a first predetermined helix angle; and
a plurality of spaced V-shaped notches transversely interrupting said relieved land surface, said plurality of spaced V-shaped notches being at a second predetermined helix angle, said second predetermined helix angle being opposite said first predetermined helix angle such that said plurality of spaced V-shaped notches are located in staggered positions from one of said plurality of blades to an adjacent other of said plurality of blades to form a plurality of cutting edges at the intersection of said leading face side and said relieved land surface, said plurality of spaced V-shaped notches transversely interrupting said relieved land surface further defining a plurality of longitudinally spaced apart cutting teeth on each of said plurality of blades, each of said cutting teeth being spaced a predetermined distance apart along said second predetermined helix angle and further having a leading face edge, a trailing face edge spaced from said leading face edge, and a flat land therebetween, said plurality of spaced V-shaped notches transversely interrupting said relieved land surface further having a straight line root surface tapered radially inwardly toward said longitudinal axis of said cutting body portion to define a flat groove relief angle such that said plurality of cutting edges, said leading face edge, and said trailing face edge of each of said plurality of cutting teeth have a positive relief.

2. The rotary cutting tool as claimed in claim 1 wherein said predetermined distance of said plurality of longitudinally spaced apart cutting teeth is variable.

3. The rotary cutting tool as claimed in claim 1 wherein said cutting body portion has the general configuration of a frustum.

4. The rotary cutting tool as claimed in claim 1 wherein said cutting body portion is cylindrical in form and wherein the angle and position of said plurality of spaced V-shaped notches define a series of parallel, continuous spirals extending in a helical direction from blade to blade around said cutting body portion of said cutting tool.

5. The rotary cutting tool as claimed in claim 1 wherein said cutting body portion is cylindrical in form and wherein further said plurality of blades and flutes extend in a helical direction around said cutting body portion.

6. The rotary cutting tool as claimed in claim 5 wherein said plurality of spaced V-shaped notches are arranged in such a pattern from blade to blade that a continuous, imaginary line passing across each blade at precisely the midpoint of each of said plurality of spaced V-shaped notches defines a helix of uniform angle around said cutting body portion.

7. The rotary cutting tool as claimed in claim 6 wherein said cutting body portion has the general configuration of a frustum.

8. A rotary cutting tool comprising:
a shank body portion;
a cutting body portion adjacent said shank body portion, said cutting body portion having a longitudinal axis and a plurality of helical blades separated by helical flutes extending the length of said cutting portion, each of said helical blades having a leading face side, a trailing face side spaced from said leading face side, and a relieved land surface bridging said leading face side and said trailing face side, said plurality of helical flutes and blades being at a first predetermined helix angle;
at least one V-shaped groove transversely interrupting said relieved land surface, said at least one V-shaped groove spiraling circumferentially from one of said plurality of blades to an adjacent other of said plurality of blades along a second predetermined helix angle to form a plurality of cutting edges at the intersection of said leading face side and said relieved land surface, said second predetermined helix angle being opposite said first predetermined helix angle such that said at least one V-shaped groove transversely interrupts said relieved land surface further defining a plurality of longitudinally spaced apart cutting teeth on each of said plurality of helical blades, each of said cutting teeth being spaced a predetermined distance apart and further having a leading face edge, a trailing face edge spaced from said leading face edge, and a flat land therebetween, said at least one V-shaped groove transversely interrupting said relieved land surface further having a straight line root surface tapered radially inwardly toward said longitudinal axis of said cutting body portion to define a flat groove relief angle; and said at least one V-shaped groove further defining a first positive relief angle on said trailing face edge of said plurality of longitudinally spaced apart cutting teeth and a second positive relief angle on said leading face edge of said plurality of spaced apart cutting teeth.

9. The rotary cutting tool as claimed in claim 8 wherein said flat groove relief angle is greater than seven degrees (7°).

10. The rotary cutting tool as claimed in claim 8 wherein said second positive relief angle is greater than seven degrees (7°).

11. The rotary cutting tool as claimed in claim 8 wherein said V-shaped groove defines a groove angle.

12. The rotary cutting tool as claimed in claim 11 wherein said groove angle is greater than forty degrees (40°).

13. The rotary cutting tool as claimed in claim 12 wherein said flat groove relief angle is greater than seven degrees (7°).

14. The rotary cutting tool as claimed in claim 1 wherein said flat groove relief angle is greater than seven degrees (7°).

15. The rotary cutting tool as claimed in claim 1 wherein each of said plurality of spaced V-shaped notches defines a groove angle.

16. The rotary cutting tool as claimed in claim 15 wherein said groove angle is greater than forty degrees (40°).

17. The rotary cutting tool as claimed in claim 16 wherein said flat groove relief angle is greater than seven degrees (7°).

* * * * *

UNITED STATES PATENT AND TRADEMARK OFFICE
CERTIFICATE OF CORRECTION

PATENT NO. : 4,721,421

DATED : January 26, 1988

INVENTOR(S) : Roger L. Klinger

It is certified that error appears in the above-identified patent and that said Letters Patent is hereby corrected as shown below:

Column 1, line 16, delete "scribed" and insert ---- scribe ----.

Column 1, line 17, delete "will" and insert ---- mill ----.

Column 3, line 46, delete "of" and insert ---- or ----.

Column 3, line 60, after "that" insert ---- a ----.

Column 3, line 65, delete "disclosed" and insert ---- discloses ----.

Column 4, line 12, delete "disclosed" and insert ---- discloses ----.

Column 5, line 19, delete "surface" and insert ---- surfaces ----.

Column 8, line 9, delete "teeth." and insert ---- teeth, ----.

Column 11, line 34, delete "will" and insert ---- mill ----.

Signed and Sealed this

Twenty-seventh Day of September, 1988

Attest:

DONALD J. QUIGG

*Attesting Officer*  *Commissioner of Patents and Trademarks*